Sept. 2, 1930.  A. PETER  1,774,760
BRAKE MAGNET CONTROL DEVICE
Original Filed June 11, 1926
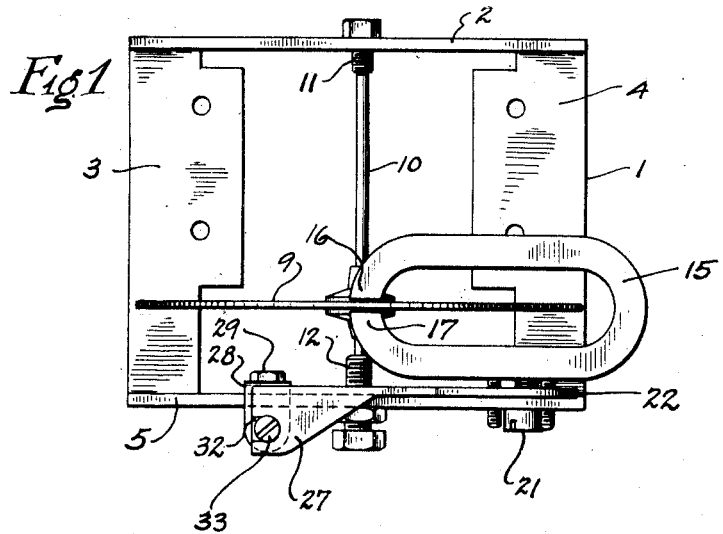
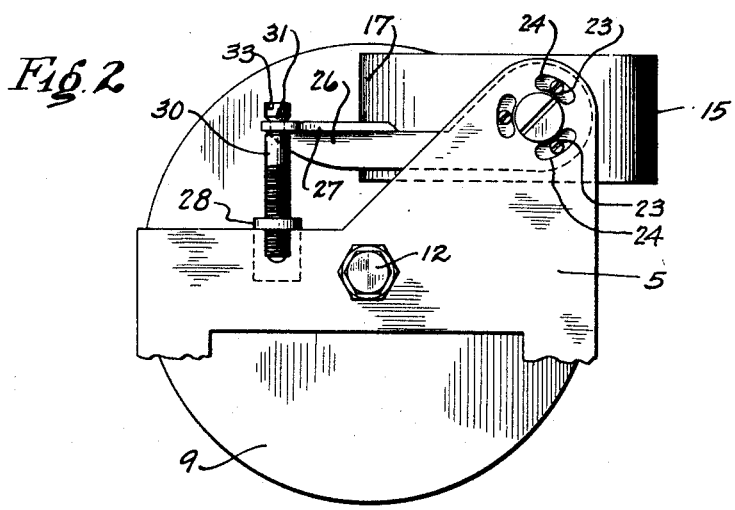
INVENTOR
Adolf Peter
BY
John D. Morgan
ATTORNEY Patented Sept. 2, 1930

1,774,760

UNITED STATES PATENT OFFICE

ADOLF PETER, OF ZUG, SWITZERLAND, ASSIGNOR TO LANDIS & GYR., A.-G., A JOINT-STOCK COMPANY OF SWITZERLAND

BRAKE-MAGNET CONTROL DEVICE

Application filed June 11, 1926, Serial No. 115,247, and in Switzerland August 13, 1925. Renewed January 23, 1930.

The invention relates to a novel and useful improvement in regulating devices for induction motors, and more particularly to novel and useful regulating devices for a brake magnet operating on the meter disc of an induction meter.

The main object of the present invention is to provide simple and exceedingly accurate means for regulating the action of a brake magnet on the meter disc of an induction meter, this being effected in the present preferred embodiment by an exceedingly accurate radial positioning of the brake magnet relatively to the meter disc, and preferably by a single control or actuating means.

The accompanying drawings, referred to herein and constituting a part hereof, illustrate one embodiment of the invention, and together with the description, serve to explain the principles of the invention.

Of the drawings:—

Fig. 1 is a side elevation of a part of an induction meter embodying the invention; and Fig. 2 is a bottom plan of Fig. 1.

Referring now in detail to the embodiment of the invention illustrated by way of example in the accompanying drawings, the invention is shown applied to a standard form of induction meter, only such parts of the meter being shown as are necessary or useful in explaining the present invention. The frame 1 of an induction meter comprises a horizontally projecting top plate 2, with integral, vertically-disposed side plates 3 and 4, and an integral, horizontally-disposed bottom plate 5. A meter disc 9 is fixed on a shaft 10, journaled in a top adjustable bearing 11, and a bottom adjustable bearing 12, all of which mechanism may be of any known or suitable form.

A brake magnet 15, which may be a permanent magnet of oval or loop form is preferably employed, and this in itself may likewise be of known or other suitable form. As shown one pole 16 thereof is located above and close to the top side of meter disc 9, and the opposite pole 17 thereof is beneath and close to the under side of the meter disc 9, the disc projecting into the internal opening or space of the magnet in a well-known manner.

Referring now to the means for effecting accurate radial positioning of the magnet relatively to the meter disc, a magnet support is provided which is carried by, but is movable relatively to, the meter frame, and which carries the magnet in fixed position thereon, and a micrometer device for relatively positioning the support with reference to the frame. In detail, the brake magnet and its support are pivotally mounted on the frame, by means of a headed screw 21, screwed into the underside of the magnet 15. This screw passes through the magnet-supporting plate 22 (which rests upon the horizontally-disposed meter frame member 5), and also through the meter frame member 5, the head of the screw contacting with the lower face of the frame member.

Screw-threaded into the magnet-supporting member 22 are a plurality of screws 23, preferably three in number. These screws are turned to cause their points to press firmly against the underside of the magnet 15, and in cooperation with the screw 21 this locks the magnet on its support 22. The other ends of the screw 23 project through arcuate openings 24 in the meter frame member 5, and thus constitute in addition guiding means for the device. The magnet is thus locked in fixed position upon the supporting member 22; the member 22 is movable pivotally about the screw 21, and the magnet is thereby movable radially relatively to the meter disc 9.

Means are provided for nicely and accurately moving and relatively positioning the magnet with respect to the meter disc, and for this purpose the supporting member 22 has an arm-like extension 26, provided with a downwardly-extending flange 27. On the edge of the meter frame member 5 is fixedly mounted an angled plate 28, held in position by a screw 29. A micrometer screw 30 has a reduced neck portion 31, which fits into an open notch 32, formed in the edge of the depending flange 27, of the meter supporting plate 22, the screw being provided with a slotted head 33. The screw 30 has a very fine thread, and is screw-threaded into the downwardly-depending portion of the plate 28. By turning screw 30, a very fine and accurate movement of the magnet and its support relatively to the meter frame is effected. The magnet-supporting plate 22, or the frame member 5, or both of them, may be provided with a scale, or scales, or any suitable calibrating means, if desired.

It will be understood from the foregoing that an exceedingly nice and accurate micrometer positioning means for the brake magnet relatively to the meter disc has been provided; and further that changes may be made in the specific structure, as exemplarily described and shown, without departing from the principles of the invention and without sacrificing its chief advantages.

What I claim is:—

1. In an induction meter, the combination of a magnet supporting bracket, a brake magnet mounted on the bracket by a screw, a plate mounted on the bracket by the magnet mounting screw, a plurality of adjusting screws mounted on the plate and pressing against the magnet and a screw cooperating with the plate to move the plate and magnet.

2. In an induction meter, the combination of a magnet supporting bracket having a plurality of curved slots, a brake magnet pivotally mounted on said bracket by a screw, a plate mounted on the bracket by means of the magnet mounting screw, a plurality of adjusting screws threaded in the plate pressing against the magnet and projecting through the slots on the bracket thereby permitting adjustment of the magnet in all directions, an arm extending from the plate and an adjusting screw between the plate and bracket for minutely turning the magnet.

In testimony whereof I have signed my name to this specification.

ADOLF PETER.